United States Patent
Du et al.

(10) Patent No.: US 11,964,443 B2
(45) Date of Patent: Apr. 23, 2024

(54) METHOD FOR CONNECTING A CONNECTION PIECE TO A U-SHAPED RING ANCHOR FOR A HEAD MODULE FOR RAIL VEHICLES

(71) Applicants: CRRC QINGDAO SIFANG CO., LTD., Shandong (CN); CG RAIL—CHINESISCH-DEUTSCHES FORSCHUNGS-UND ENTWICKLUNGSZENTRUM FÜR BAHN-UND VERKEHRSTECHNIK DRESDEN GMBH, Dresden (DE)

(72) Inventors: Jian Du, Shandong (CN); Peng Lin, Shandong (CN); Dongfang Chen, Shandong (CN); Zhengmin Zhang, Shandong (CN); Yonggui Zhang, Shandong (CN); Chunpeng Cao, Shandong (CN); Werner Hufenbach, Dresden (DE); Andreas Ulbricht, Dresden (DE)

(73) Assignees: CRRC QINGDAO SIFANG CO., LTD., Shandong (CN); CG RAIL—CHINESISCH-DEUTSCHES FORSCHUNGS- UND ENTWICKLUNGSZENTRUM FÜR BAHN- UND VERKEHRSTECHNIK DRESDEN GMBH, Dresden (DE)

( * ) Notice: Subject to any disclaimer, the term of this patent is extended or adjusted under 35 U.S.C. 154(b) by 1296 days.

(21) Appl. No.: 16/484,099

(22) PCT Filed: Feb. 5, 2018

(86) PCT No.: PCT/EP2018/052772
§ 371 (c)(1),
(2) Date: Aug. 6, 2019

(87) PCT Pub. No.: WO2018/146040
PCT Pub. Date: Aug. 16, 2018

(65) Prior Publication Data
US 2020/0001554 A1  Jan. 2, 2020

(30) Foreign Application Priority Data
Feb. 9, 2017 (DE) .................. 10 2017 102 566.9

(51) Int. Cl.
*B29C 70/86* (2006.01)
*B29C 70/54* (2006.01)
(Continued)

(52) U.S. Cl.
CPC ............ *B29C 70/86* (2013.01); *B29C 70/545* (2013.01); *B61D 17/005* (2013.01);
(Continued)

(58) Field of Classification Search
CPC ........ B29C 70/86; B29C 70/545; B29C 70/54; B29C 70/34; B29L 2031/3002; B29L 2031/3064
(Continued)

(56) References Cited

U.S. PATENT DOCUMENTS

| | | |
|---|---|---|
| 3,328,229 A | 6/1967 | Windecker |
| 6,431,083 B1 | 8/2002 | Carstensen et al. |

(Continued)

FOREIGN PATENT DOCUMENTS

| | | |
|---|---|---|
| BE | 698853 A | 11/1967 |
| CN | 102248678 A | 11/2011 |

(Continued)

OTHER PUBLICATIONS

First Office Action dated Oct. 30, 2020 for Chinese patent application No. 201880009579.4, English translation provided by Global Dossier.
(Continued)

*Primary Examiner* — Jeffrey M Wollschlager
*Assistant Examiner* — Xue H Liu
(74) *Attorney, Agent, or Firm* — Yue (Robert) Xu; Apex Attorneys at Law, LLP (57) ABSTRACT

The invention relates to a method for connecting a connection piece to a U-shaped ring anchor for a head module for
(Continued)

rail vehicles, the head module consisting predominantly of fiber-reinforced plastic material and having an outer shell and the ring anchor consisting of fiber-reinforced plastic material and being arranged in the roof region of the outer shell as a stiffening means. According to the method, connecting elements are fed through the dry or matrix-material-impregnated, unconsolidated fiber reinforcement structure of the ring anchor.

18 Claims, 8 Drawing Sheets

(51) Int. Cl.
    *B61D 17/00*     (2006.01)
    *B29L 31/30*     (2006.01)
    *B61D 1/00*     (2006.01)

(52) U.S. Cl.
    CPC .................. *B29L 2031/3002* (2013.01); *B29L 2031/3064* (2013.01); *B61D 1/00* (2013.01)

(58) Field of Classification Search
    USPC ......................................................... 264/257
    See application file for complete search history.

(56) References Cited

U.S. PATENT DOCUMENTS

| | | |
|---|---|---|
| 2010/0064931 A1 | 3/2010 | Heinisch et al. |
| 2011/0229336 A1 | 9/2011 | Richter et al. |
| 2014/0017074 A1 | 1/2014 | Olivier |

FOREIGN PATENT DOCUMENTS

| | | |
|---|---|---|
| CN | 103415388 A | 11/2013 |
| CN | 105459417 A | 4/2016 |
| CN | 106273559 A | 1/2017 |
| DE | 3715409 A1 | 12/1987 |
| DE | 19725905 A1 | 12/1998 |
| DE | 102014204761 A1 | 9/2015 |
| FR | 2834926 A1 | 7/2003 |
| WO | 2010029188 A1 | 3/2010 |
| WO | 2015011193 A1 | 1/2015 |

OTHER PUBLICATIONS

International Search Report for PCT/EP2018/052772 dated May 30, 2018, ISA/EPO.

METHOD FOR CONNECTING A CONNECTION PIECE TO A U-SHAPED RING ANCHOR FOR A HEAD MODULE FOR RAIL VEHICLES

CROSS-REFERENCE TO RELATED APPLICATIONS

This application is the national phase of International Application No. PCT/EP2018/052772, titled "METHOD FOR CONNECTING A CONNECTION PIECE TO A U-SHAPED RING ANCHOR FOR A HEAD MODULE FOR RAIL VEHICLES", filed on Feb. 5, 2018, which claims the priority of German patent application No. 102017102566.9 filed on Feb. 9, 2017, the entire disclosures of the applications are incorporated herein by reference.

The present invention relates to a method with which a connection piece can be connected to a special ring beam structure made of fibre composite material for connection to a following coach section with the ring beam. The ring beam is part of the construction of a head module for a rail vehicle and is to contribute to the dissipation and distribution of the loads that occur in the event of a crash.

In particular, the head module is a construction for commuter trains, in particular underground trains. In such trains, the head module is often integrated into the coach. The head module is also referred to as cab in the following.

In the interests of material and energy efficiency, in recent years the use of light materials and of the principles of lightweight construction has become increasingly established in rail vehicle construction. In particular the use of fibre composite materials is constantly increasing. This also applies to the design of the head modules of rail vehicles.

Known constructions here provide for attaching prefabricated modules to the substructure, which runs through the entire coach without interruption.

Thus DE 197 25 905 relates to a method for connecting a prefabricated head module made of fibre-reinforced plastic (FRP) to the underframe and the coach body module. The side walls of the head module are preferably manufactured as a sandwich structure made of FRP with a core material in between. Here, special reinforcing profiles are used in the joining areas of the head module, which improve the force transmission between underframe or coach module and the FRP walls of the head module. A special design of the fibre direction of the FRP reinforcement is not provided. The reinforcing profiles are integrated into the core of the FRP walls of the head module and act as support for the bolt connection between FRP walls of the head module and underframe or coach body module. A disadvantage here is that the reinforcing fibre material between the reinforcing profile and the underframe is subjected to a compressive load and there is thus the risk of damage, due to creep, to the FRP material in this area.

DE 10 2014 204 761 A1 deals with the problem of crash safety, in particular of the front panel, in the case of the rail vehicle header modules. It is provided that the frame of the front panel has a deformation element which can absorb energy and dissipate it through its deformation. The front panel is as far as possible to move out of the frame without the formation of fragments. This is realized in DE 10 2014 204 761 A1 in that predetermined breaking points are provided in the frame of the front panel or in proximity thereto. The predetermined breaking points are produced through the geometric design, the dimensioning of the deformation element or the material thereof. In an embodiment, the deformation element is to run partly or completely around the front panel. The frame can also be formed by the vehicle shell itself.

WO 2015/011193 A1 relates to an energy absorption device for rail vehicles. The purpose of this device is to absorb a portion of the impact energy and to convert it into material deformation in the event of a crash. For this a three-dimensionally formed body made of FRP is used. This has layers with unidirectionally oriented fibres and layers with fibres arranged omnidirectionally (randomly oriented fibres). The energy absorption is realized in particular in that a counter-element strikes the energy absorption element in the longitudinal direction and destroys, in particular by fibrous disintegration, the ply or plies with randomly oriented fibres. The arrangement of the fibres without a preferred direction guarantees that the impact energy is converted when the fibres are broken down and does not lead to a delamination of different fibre layers.

WO 2010/029188 A1 discloses a self-supporting vehicle head which is preferentially composed of fibre composite material. The vehicle head has structural elements which serve to absorb energy in the event of a crash as well as other structural elements which do not have a specific function for energy dissipation. In particular, the energy-absorbing structural elements are also to consist of fibre composite material. It is furthermore provided that a series of energy-dissipating structural elements successively contributes to the energy absorption or transmits corresponding forces. The vehicle head has a central buffer coupling which due to its design lies in front of the external cladding of the vehicle head. An energy absorption element that is to absorb impacts exerted on the central buffer coupling is therefore arranged directly behind the central buffer coupling. In addition, two lateral energy absorption elements are arranged parallel thereto, which are to act as anti-overriding protection. Furthermore, the railing underneath the front window has at least one, preferably two, energy absorption elements. On each side of the head section, two lines for energy transmission lead from the railing into the substructure of the coach section. In addition, two energy absorption elements are arranged in front of the two A pillars in the direction of movement. The A pillars are designed to conduct kinetic energy into the roof structure and to dissipate in a controlled manner any impact energy still remaining in the event of a crash. This is necessary as conventional coach section constructions do not have any longitudinal beams arranged in the roof area, which could absorb portions of the impact energy. A disadvantage here is that a force exerted on the railing in conjunction with the two lateral lines for energy transmission can lead to a lever action on the roof construction, which sets the latter in motion, substantially perpendicular to the direction of movement of the vehicle. This can at least reduce the ability of the roof construction to absorb remaining impact energy. There is thus a disadvantageous coupling of safety systems. The roof structure is designed as sandwich component. Special reinforcements or force-conducting elements are not provided.

The named solutions are suitable for trains which can be exposed to a plurality of different collision opponents. The solutions applied are accordingly complex.

A suitable construction for a vehicle head (head module), in particular for underground trains and similar applications which operate on separate route networks and can be exposed to largely only similarly constructed collision opponents, has no continuous substructure which reaches from the coach section into the head module.

In particular, the head module has to be suitable to be able to be placed in front of the corresponding coach sections. For this the design features of these coach sections are to be taken into consideration.

In the present case, the head module is to be installed on a coach section which is characterized by corresponding interface components. These are in particular:

two longitudinal beams of the underframe, which extend in the longitudinal direction on the lower edges of the coach section and the end faces of which are suitable for the installation of the head module, an underframe support for the driver's cab, which runs between the two longitudinal beams of the underframe and opens into the main cross beam which is mounted in the bogie of the coach section. The main cross beam is supported in the two longitudinal beams of the underframe. The underframe support for the driver's cab and the main cross beam are preferably manufactured from steel.

two longitudinal beams of the coach roof which extend in the longitudinal direction on the upper edges of the coach section and the end faces of which are suitable for the installation of the head module.

The longitudinal beams are preferably manufactured from fibre composite material. All interface components have corresponding fixing options for the corresponding components of the cab. These are preferably detachable fixings, quite particularly preferably screw connections.

The head module has three systems which convert the impact energy into deformation in the event of a crash. These systems are largely constructed independently of one another and can thus advantageously act one after the other or simultaneously without the crash-induced destruction of one system being able to impair the effectiveness of the other. The systems are substantially manufactured from fibre composite material.

The three systems are:
1. a stiffener designed as a ring beam in the roof area of the cab, which conducts forces into the upper longitudinal beams of the following coach section,
2. a railing reinforcement which conducts impact forces into the lower longitudinal beams of the following coach section via UD braces running on the sides of the cab,
3. a lower crash conduction element which is fitted with a crash box and in addition conducts the remaining impact energy into the underframe support.

The three crash systems thus conduct the remaining impact forces into different components of the following coach section.

The driver's cab is preferably formed as a two-shell construction which predominantly, up to at least 50%, preferably up to at least 75% and quite particularly preferably up to at least 85% of the weight of which (without taking fittings like cupboards, seats and installations like lighting, cables etc. into account) consists of fibre composite material. The outer shell is connected to the three systems which convert the impact energy into irreversible deformation in the event of a crash. The inner shell lines the actual interior space which can be used by passengers. Both shells are formed as fibre composite structures which do not make any significant contributions to the crash resistance. The outer shell guarantees the necessary stiffness of the construction in that it is realized as a multilayered fibre composite structure, optionally with cores lying between the fibre layers. Laid, twisted or braided fibre fabrics can be used in the fibre layers. To improve the stiffness, UD fibre strands (unidirectional fibre strands) are also possible. It is advantageous that the A pillars of the outer cab have no special reinforcements for the force transmission in the event of a crash. This prevents a disadvantageous force transmission onto the ring beam from occurring in the event of a crash or at least limits it. The A pillars of the outer cab are preferably designed for the feeding-through of electrical wires. The outer cab shell is preferably constructed from fibre non-crimp fabrics which are then impregnated with a matrix material and consolidated. The construction from fibre non-crimp fabrics pre-impregnated with matrix material is also possible. The outer shell is preferably connected to the inner shell in the area of the front and side windows. Here the two shells are screwed, adhesively bonded or connected to each other in another way. The front window is preferably glued into the outer shell. Predetermined breaking points, which guarantee that the front window breaks away from the frame in the event of a crash and no or only a few fragments reach the interior, are preferably provided. In a further preferred embodiment, the front window has its own frame with which it is fixed in the outer shell. Predetermined breaking points are also preferred here.

The ring beam is particularly important. The ring beam has a U shape in which the two ends of the ring beam are fixed to the upper longitudinal beams of the following coach section. The front surface of the ring beam (corresponds to the lower curvature of the U shape) is arranged on the inner surface of the upper front side of the outer cab shell. The ring beam is preferably designed as a fibre composite component. UD fibre plies which run over the entire length of the ring beam from one fixing point on an upper longitudinal beam of the following coach section to the other fixing point on the other upper longitudinal beam of the following coach section, are used for the ring beam here. These UD fibre plies can be used alternating with fibre plies which can have differing fibre orientations. Fibre plies made of woven fabrics are preferred. In particular, fibre plies with differing orientations or woven fabric or meshwork are used to hold the UD fibres in place before the consolidation. In particular, composite materials reinforced with carbon fibres are preferably used.

The connection of the ends of the ring beam to the upper longitudinal beams of the following coach section is preferably realized by connection pieces. These connection pieces support the connection to upper longitudinal beams of the following coach section in that, with sufficient strength, they provide the required openings for the installation (preferably screw connection). These openings are in particular one screw opening or several screw openings for each ring beam end with respect to corresponding openings in the upper longitudinal beams of the following coach section. In addition, optional openings are provided through which connecting bolts, or nuts, screws or similar can be inserted into the openings and optionally held up there in the case of screw connections.

Thus the connection pieces must be able to transmit large forces both during normal operation and in the event of a crash.

Conventional methods for connecting the connection pieces to the ring beam ends envisage that the already consolidated ring beam is provided with bores through which the metallic connecting elements which hold the connection pieces on the ends of the ring beam can then be fed. The disadvantage of this approach is that the fibre structure in the ring beam is damaged during boring. In addition, the metallic bolts, rivets or screws which are to hold the connection piece must be protected against direct contact with the open ends of the carbon-fibre reinforcing materials. Otherwise electrochemical corrosion could weaken or destroy the bolts or screws.

Thus the object is to propose a method with which the connection pieces can be fixed on the ends of the ring beam, which avoids the named disadvantages.

The object is achieved according to the invention with a method according to claim 1. Advantageous approaches are disclosed in the subordinate dependent claims.

The ring beam is preferably manufactured together with the outer cab shell. A ring beam moulded part that already has the fibre-reinforcing structure of the ring beam is placed in a section mould of the mould in which the outer cab shell is manufactured. Optionally the section mould can be formed by a correspondingly milled core. The fibre plies of the ring beam and of the outer cab shell are then impregnated with matrix material together and this is then consolidated (the matrix material is cured). It is also possible to pre-impregnate the ring beam moulded part with matrix material and then place it in the section mould or place it on a support construction comprising the section mould on which the further fibre plies of the outer shell are then placed, likewise as pre-impregnated fibre plies (e.g. as pre-pregs). Here too this is then consolidated.

A further preferred embodiment provides for manufacturing the outer cab shell and the ring beam as separate components and introducing the consolidated ring beam into the consolidated outer cab shell and fixing it there, preferably gluing it in. The section mould is then located outside the mould in which the outer cab shell is manufactured.

In yet a further preferred embodiment, the fibre-reinforcing structure of the ring beam is constructed in plies of fibre-reinforcing plies in the mould.

The ring beam consists of several plies of reinforcing fibres. Both plies of unidirectional fibres (UD plies) and braided or bidirectionally laid plies are used. The different plies advantageously alternate with each other.

In particular it is advantageous to surround a core with UD fibres with a braided or twisted outer shell which determines the shape of the ring beam. Advantageously, non-crimp fabrics made of rovings or pre-pregs can also be used as outer shell. The individual plies of the ring beam are preferably connected to each other. This can be effected by sewing, knitting or clamping. The use of plastic connectors is also possible.

To avoid the disadvantageous boring through of the consolidated fibre composite material at the ends of the consolidated ring beam, according to the invention the metallic connecting elements are positioned at the provided points, according to the device, or freely, in the dry or in the wet, unconsolidated state (impregnated with matrix material) of the matrix material and fed through the reinforcing fibre structure, wherein the fibres are displaced but not damaged.

In a first preferred embodiment, the connection piece is designed in one part so that it completely surrounds the end of the ring beam and is held by metallic connecting elements which completely penetrate the ends of the ring beam.

In a further preferred embodiment, the connection piece is designed in several parts, particularly preferably two parts. Particularly preferred is a two-part design, in which the end of the ring beam is held between two half-shell-shaped parts, of the connection piece. Here, the two parts of the connection piece are arranged facing each other on one end of the ring beam.

In a third preferred embodiment, the connection piece is designed in one part or in several parts, but is characterized in that it does not completely enclose the end of the ring beam. The metallic connecting elements are supported in washers or shims on the surface of the ring beam material on one side and by the material of the connection piece on the other side.

In a first preferred procedure, the method according to the invention envisages the provision of the reinforcing fibre material in the sought outer shape in the dry state or in the unconsolidated state impregnated with matrix material. This is effected in that the ring beam (as a series of plies) is placed in a section mould and the connection pieces are placed on the ring beam and the metallic connecting elements are then pushed through the reinforcing fibre plies. Alternatively, the connection pieces can first be placed in the section mould and the unconsolidated ring beam then introduced. In order to ensure both an absolute and relative positioning, the connecting elements can optionally be prepositioned on a support plate. Advantageously there is no damage to the fibres when the fibre plies are penetrated. The reinforcing fibre material of the outer housing shell can then be deposited on the ring beam and a joint impregnation with matrix material effected or, if all fibre materials are pre-impregnated, the consolidation effected. After the consolidation, the ring beam is connected by material bonding to the outer housing shell, exclusively via the matrix material. Finally, outer housing shell and ring beam can be removed from the mould in one piece.

In a second preferred procedure, the reinforcing fibre material of the ring beam is prepared in a separate section mould in the dry state or in the unconsolidated state impregnated with matrix material. The metallic connecting elements are then pushed through the reinforcing fibre plies and the connection pieces installed. Advantageously this is also effected without damaging the fibres of the reinforcing fibre material. The reinforcing fibre material, if it has been prepared in the dry state, can then be impregnated with matrix material. In both cases (reinforcing fibre material prepared dry or impregnated) the prepared ring beam can then be removed and placed in the mould for the production of the outer shell. Further processing is then effected as in the first preferred procedure.

A third preferred procedure provides for an approach in accordance with the second preferred procedure, but with partial consolidation of the impregnated reinforcing fibre material after fitting of the connection pieces, and only then the transfer into the mould for the production of the outer shell.

The metallic connecting elements can be prepared as individual components or fixed (e.g. welded or glued) to a part of the connection piece.

As individual components, the connecting elements preferably have a head and a rod-shaped body which has a smaller diameter than the head. In the course of the method, the connecting elements are fed through the openings of the connection pieces provided for this purpose and the fibre plies. After the consolidation of the ring beam, shims (washers), or a further section of the connection piece, are preferably deposited on the respective consolidated end of the ring beam and fixed there. This is effected e.g. by screwing or riveting the ends of the connection pieces. In each embodiment, the connection pieces completely penetrate the ring beam.

Tests have shown that it can be problematic to push the bolts or connecting screws through the fibre plies. From the state of the art, it is known in such cases to use an awl which, using its pointed shape, pushes through the fibres, whereupon the connecting elements (screws, bolts) can easily be guided through the now created openings. In this approach, the awl is designed as a separately formed tool.

Such a method is known from DE 37 15 409 A1. The disadvantage here is that the method is laborious to carry out as first the awls are driven through the fibre plies and then the actual force transmission elements are introduced.

In a particularly preferred procedure according to the invention, the connecting elements (screws, bolts) are therefore themselves formed as awls and therefore need not be removed after successful penetration of the fibre plies. In a simple procedure, the connecting elements are designed pointed on the side which penetrates the fibre plies.

A second advanced embodiment provides that the pointed design of the connecting elements is realized by a removable tip. The removable tip can either be screwed onto an external thread section at the end of the connecting element with which the fibre plies are penetrated or the removable tip is inserted or screwed into an axial opening at the end of the connecting element with which the fibre plies are penetrated.

An advantageous development provides that the tip, if there is a screw connection to the connecting element, is flattened on at least two opposite sides in order to enable a spanner, preferably an open-end spanner, to be applied for installation or deinstallation. The transition from the flat area to the rest of the removable tip in the direction of the connecting element is preferably designed round so that the fibres can also slide in this area upon penetration of the plies.

In a preferred approach, the thread turns of screws are to be protected, i.e. the thread turns are to be prevented from filling with resin. For this, both the thread turns and the sleeves forming the awl are provided with suitable release agents.

During penetration of the fibre plies, the surface of the connecting element is preferably coated with a friction-reducing agent which furthermore preferably also has the effect of a release agent.

When they penetrate the fibre plies, in particular in the case of carbon fibres, the connecting elements are preferably provided with a surface coating which prevents or at least greatly reduces a direct, electrically conductive contact between the material of the connecting elements and the carbon fibres. The friction-reducing agent and the surface coating can be identical if the chosen material has the necessary properties. Such materials are known from the state of the art.

Connecting elements which are provided with an external thread can disadvantageously get caught on fibres by this during penetration and cause them to break. In an advanced embodiment, the connecting elements therefore have a casing. This is preferably designed as a type of tube fitted tightly to the connecting elements. In the case of connecting elements provided with an external thread, this casing can also be screwed on. In a preferred procedure, this casing is pulled off or unscrewed and removed after the fibre plies have been penetrated so that it does not remain in the ring beam.

A further preferred embodiment provides that the casing remains in the ring beam and is co-embedded into the matrix in the course of impregnation with matrix material and subsequent consolidation. Exposed parts, or parts to be used later, of both internal and external threads are preferably to be protected against wetting with matrix material.

The protective casing preferably consists of a plastic material, particularly preferably of the same material which is used as matrix material. However it is also possible to use a suitable material which is not chemically affected by the matrix material.

An advantageous development of the casing provides that the latter is perforated in order to make it possible for the matrix material to penetrate directly as far as the connecting element. These perforations are preferably designed as axially running elongated openings over almost the whole length of the casing or also as circular or ellipsoidal (preferably semi-major axis of the ellipse parallel to the longitudinal axis of the connecting element). However, edges on which the fibres of the fibre-reinforcing material could catch are preferably to be avoided (or rounded).

In a further advantageous development, the sleeves (casings) forming the awl themselves form functional components that can be used later within the meaning of an embedded internal thread.

A coating of matrix material on the connecting elements is also possible. This is then restricted to the section of the connecting element which runs inside the ring beam in the installed state.

After the connecting elements are introduced and the matrix material of the ring beam is consolidated (this is optionally effected together with the consolidation of the external shell), the connecting elements are fixed. This is preferably effected by screwing or riveting the latter on the opposite side.

The construction of the cab and the design of the systems, in particular of the ring beam, are preferably effected using computer-aided simulation processes, which allow the design to be carried out in accordance with the regulations in force. The simulation processes and computer-aided design tools are known to a person skilled in the art.

The following figures illustrate the fixing of connection pieces on the ends of a ring beam for the head module of a rail vehicle by way of example.

Figure 1:
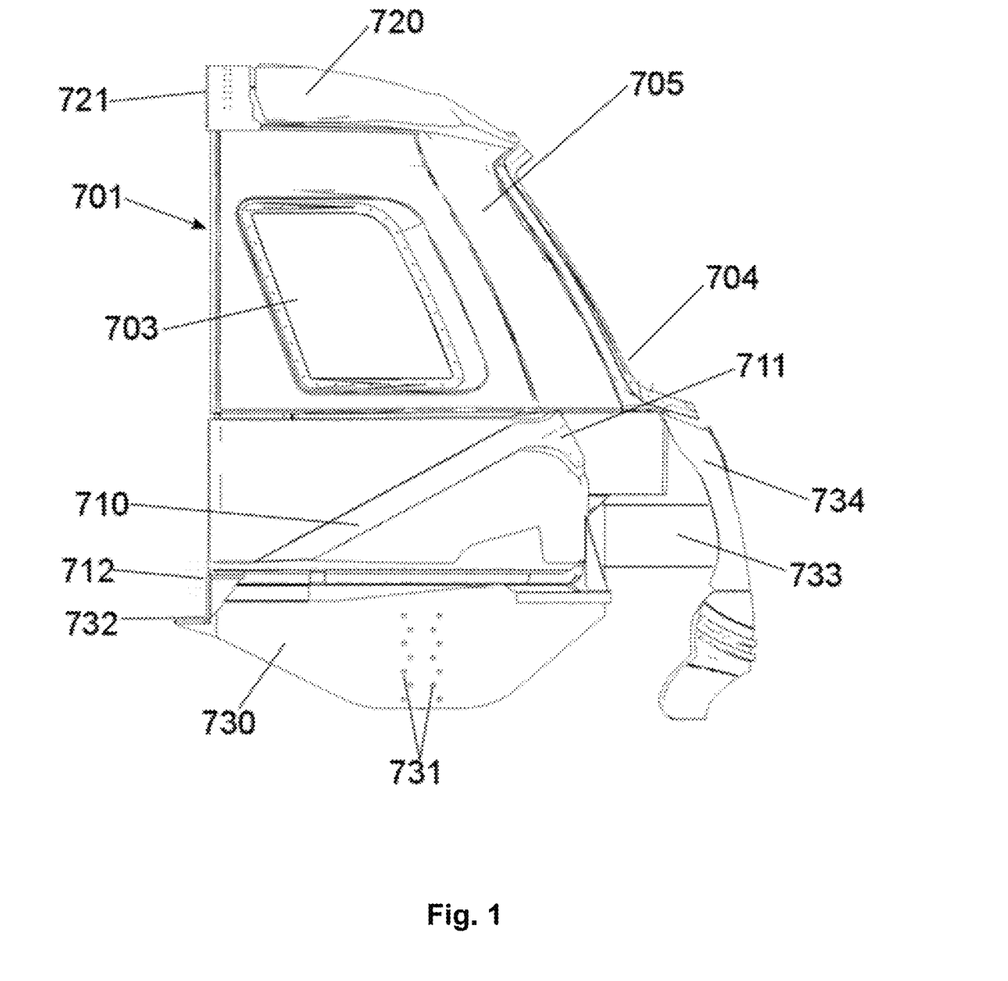

FIG. 1 shows a schematic side view of the cab without the outer shell. The central buffer coupling has also been omitted for the sake of clarity. The inner shell 701 is designed in two parts. The division occurs in the horizontal plane above the railing reinforcement 711. The upper part of the inner shell 701 comprises the opening 704 for the front window and the side windows 703. The window openings are separated from each other by the A pillar 705. Above the upper part of the inner shell the ring beam 720 is represented. It is detachably fixed to the upper longitudinal beams of the following coach section (not represented) via the connection piece 721.

The railing reinforcement 711 and the UD braces 710 which transmit the force from the railing reinforcement 711 to the introduction points 712 into the lower longitudinal beams of the following coach section are integrated into the lower part of the inner shell.

The lower crash conduction element 730 runs underneath the lower part of the inner shell. On the front side of the cab the plate 734 is represented. The crash box 733 is arranged behind it. In the event of a crash, the collision takes place on the plate 734 which passes the force onto the crash box 733 and dissipates it as far as possible there. Remaining impact energy is passed on into the lower crash conduction element 730 and there is transferred at the fixing point 732 into the underframe support of the following coach section. In the horizontal section of the lower crash conduction element 730, the openings 731 for fixing the central buffer coupling are visible.

Figure 2:
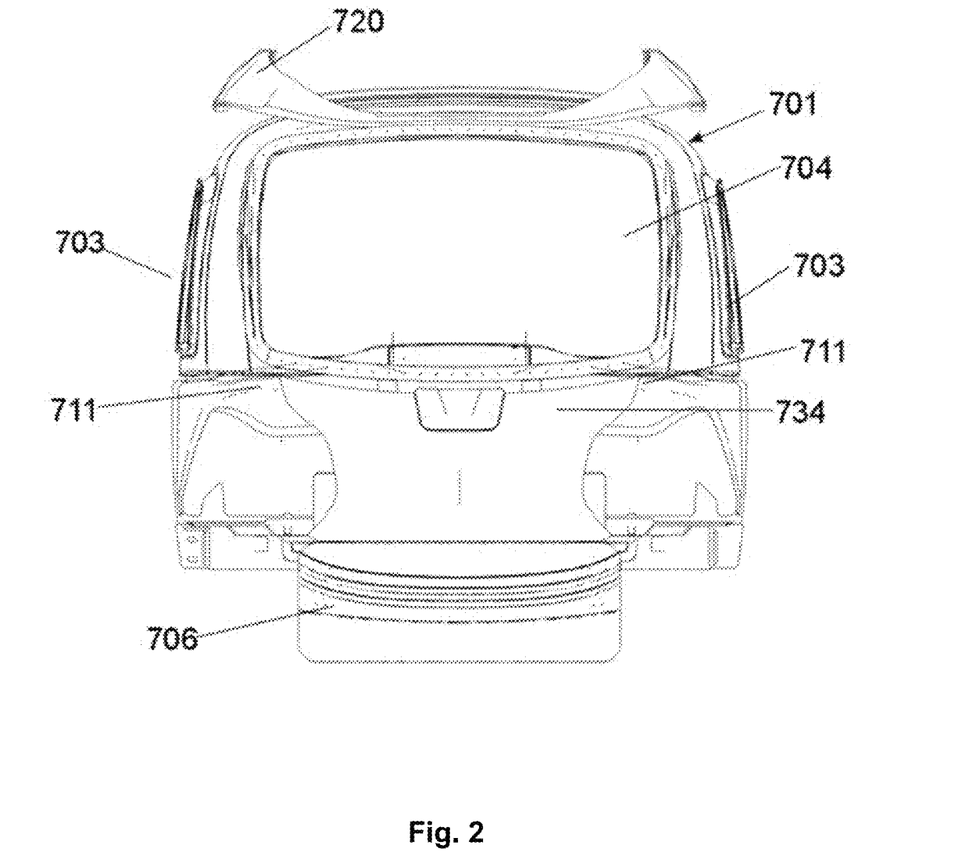

FIG. 2 shows the schematic front view of the cab without the outer shell. Compared with the side view from FIG. 1, the cover flap of the central buffer coupling with the reference number 706 is additionally provided, which fits into a corresponding opening in the outer shell.

Figure 3:
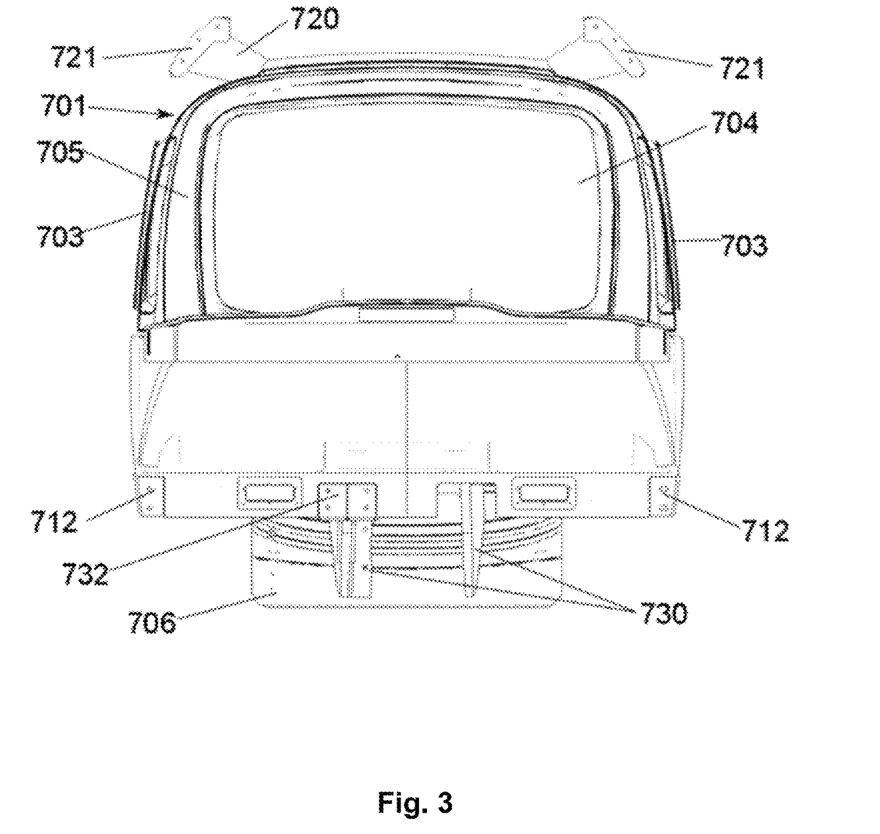

FIG. 3 shows the schematic rear view of the inner shell of the cab. This is the side with which the cab is installed on the following coach section. The installation is preferably effected on the two upper longitudinal beams of the following coach section by means of the connection pieces 721 of the upper ring beam, by means of the fixing elements at the introduction points 712 of the UD braces from the railing reinforcement and by means of the fixing device 712 (only one is represented, a second is arranged symmetrically on the right-hand side) of the lower crash element on the underframe support.

Figure 4:
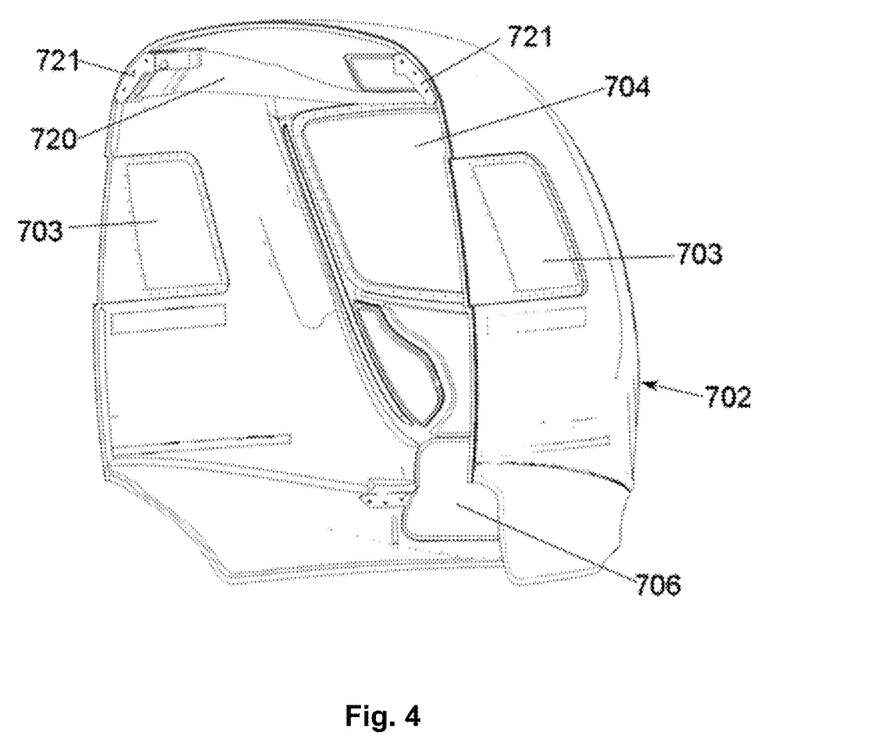

FIG. 4 shows a schematic three-dimensional view of the outer shell 702. In particular, it can be seen how the upper ring beam 720 with its connection pieces 721 fits into the outer shell 702. The opening for the cover flap 706 of the central buffer coupling is also represented.

Figure 5:
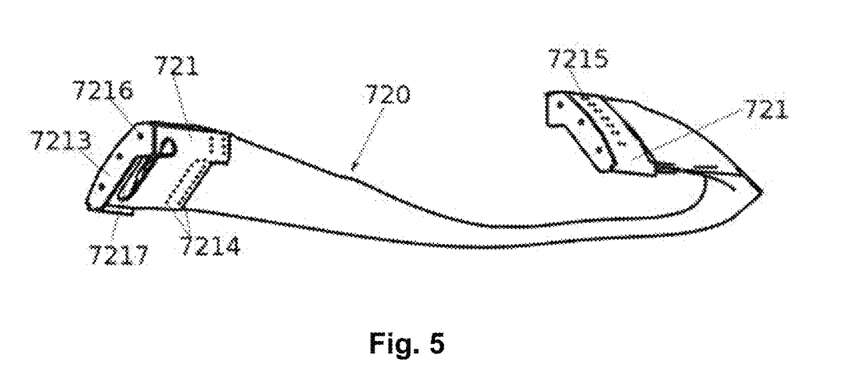

FIG. 5 shows, schematically, the structure of the ring beam 720 with the two connection pieces 721. The connection pieces 721 are connected to the ring beam via connecting elements through the openings 7214. They have the installation openings 7217 through which the ring beam is connected to the following coach section via the connection pieces and the front section 7213. For this, connecting elements, in particular screws, are fed through the openings 7216, which can be tightened through the installation opening 7217. The openings 7215 optionally allow a screw connection to the outer shell.

Figure 6:
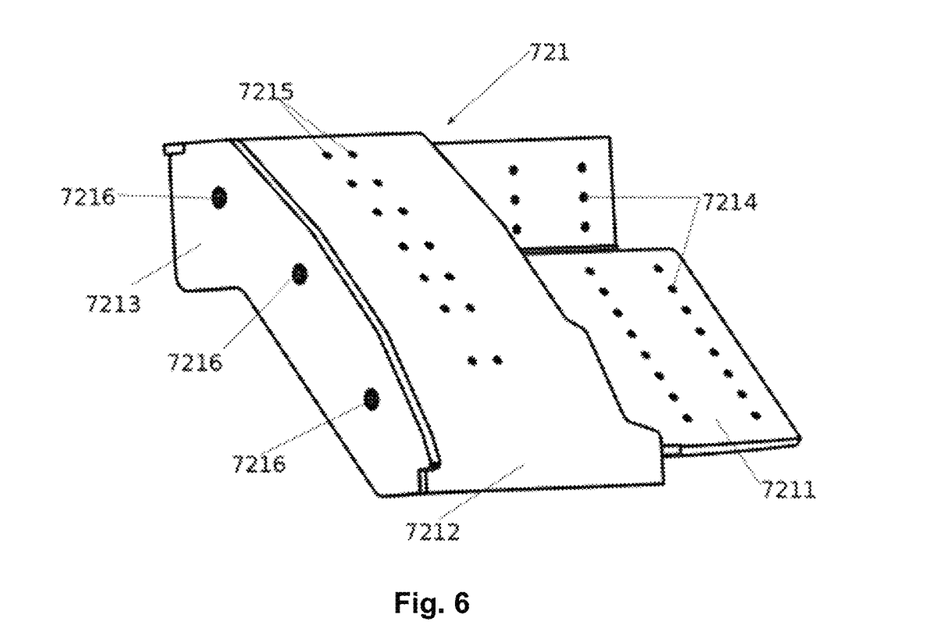

FIG. 6 shows, schematically, an embodiment of the connection piece 721. This connection piece has a lower section 7211, an upper section 7212 and the front section 7213. The sections consist of steel and are fixed to one another by means of welded joints.

Figure 7:
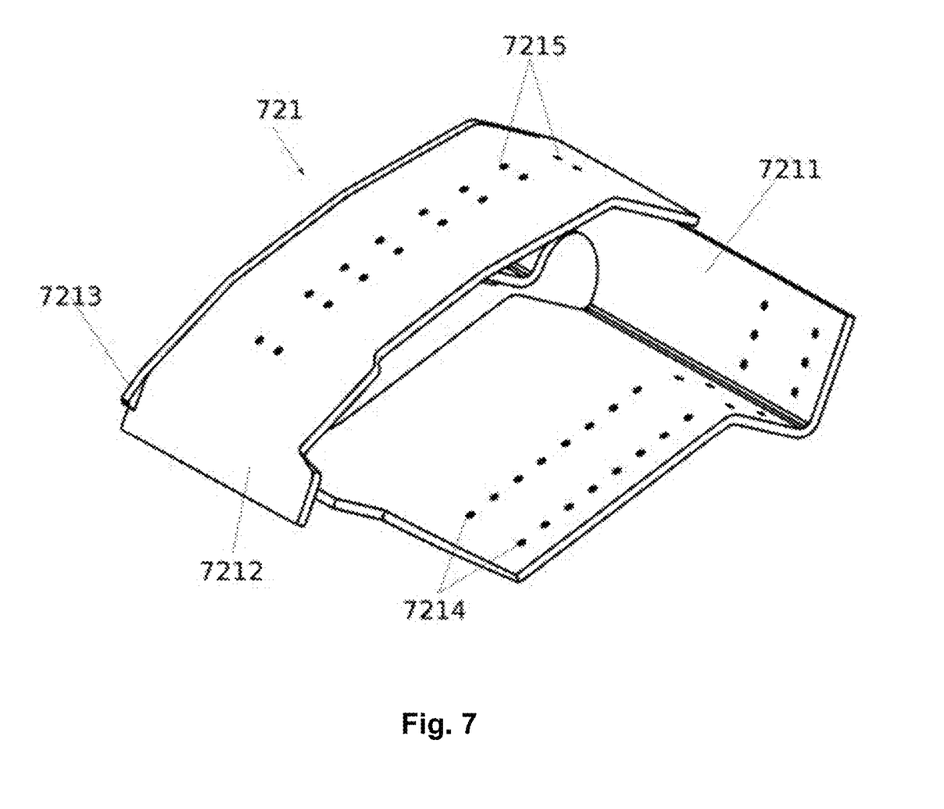

FIG. 7 shows, schematically, the connection piece according to FIG. 6 from a different perspective.

Figure 8:
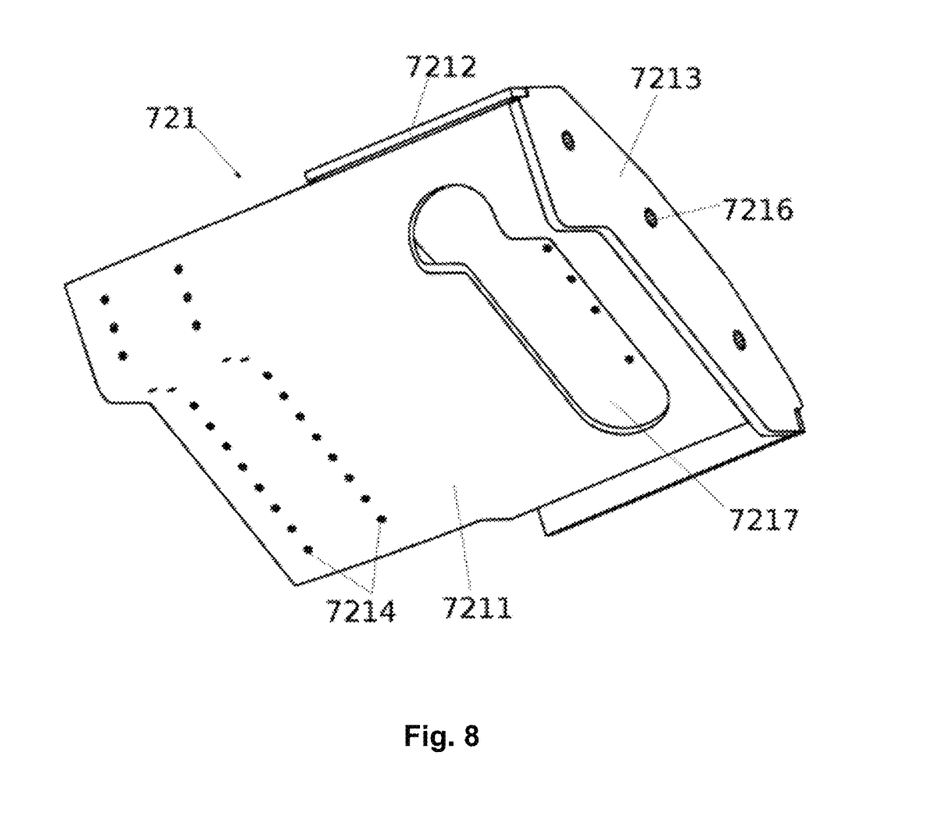

FIG. 8 shows, schematically, the connection piece according to FIG. 6 from below.

Figure 9:
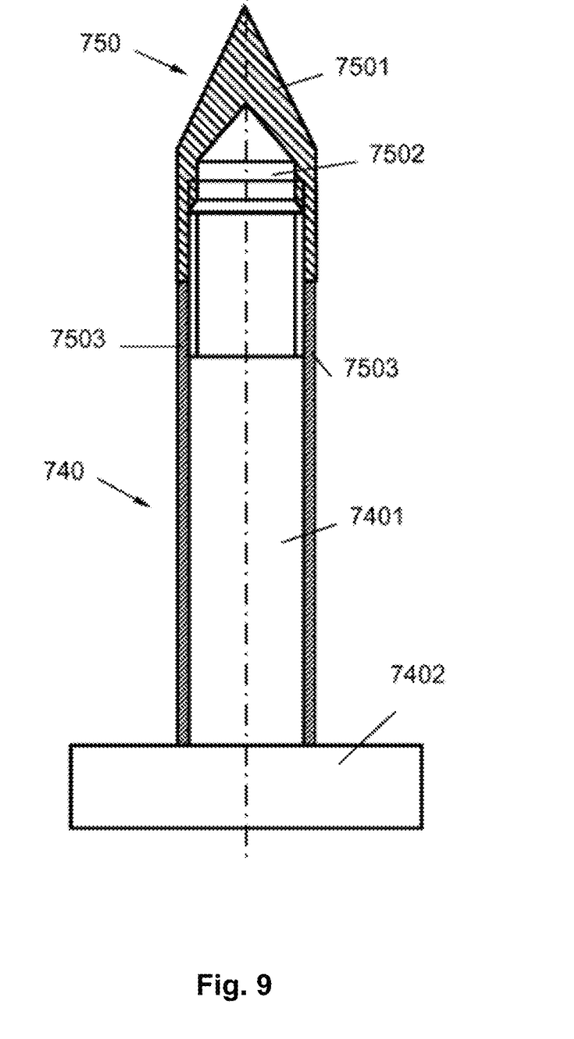

FIG. 9 shows, schematically, an embodiment for a connecting element 740 with a section through the screwed-on tip 751 and the casing 7503. The connecting element has the shape of a screw and consists of a head section 7402 and a body 7401 with a thread. It has no thread in the section which comes into contact with the matrix material after installation. The casing 7503, which prevents direct contact between the metallic connecting element and the reinforcing fibre structure, is arranged there. The casing remains in the fully consolidated and installed ring beam. The tip 751 has a pointed section 7501 which is screwed onto the thread 7502. After the fibre composite material is consolidated, the tip is unscrewed and the nut for fixing the connecting element is screwed onto the thread 7502, and a washer or a further section of the connection piece optionally placed underneath.

LIST OF REFERENCE NUMBERS 701 inner shell
702 outer shell
703 side window opening
704 front window opening
705 A pillar
706 cover flap of the central buffer coupling
707 internal fittings
710 UD brace of the railing reinforcement
711 railing reinforcement
712 introduction point of the forces from the railing reinforcement into the lower longitudinal beam of the following coach
720 ring beam
721 connection piece
7211 lower section
7212 upper section
7213 front section
7214 openings
7215 openings
7216 openings
7217 installation openings
730 lower crash conduction element
7301 section of the crash conduction element from the crash box to the horizontal section
7302 horizontal section
7303 section of the crash conduction element from the horizontal section to the fixing element on the underframe support
731 holes for fixing the central buffer coupling
732 fixing device of the lower crash element on the underframe support
733 crash box
734 plate
740 connecting bolts for fixing the connection piece to the ring beam
7401 bolt body
7402 bolt head
750 tip for supporting the penetration of the fibre-reinforcing material
7501 pointed section
7502 thread
7503 casing of the connecting bolt

What is claimed is:

1. A method for connecting a connection piece to a U-shaped ring beam for a head module for rail vehicles, wherein the head module consists predominantly of fibre-reinforced plastic material and has an outer shell, and the ring beam consists of fibre-reinforced plastic material and is arranged as stiffener in a roof area of the outer shell, having at least the following steps:
   a) preparing a mould for the outer shell with a section mould for the ring beam,
   b) preparing a fibre-reinforcing structure of the ring beam which structure is dry or impregnated with matrix material and unconsolidated, and placing it in the section mould,
   c) preparing the connection piece for each end of the U-shaped ring beam,
   d) preparing connecting elements,
   e) feeding the connecting elements through the fibre-reinforcing structure of the ring beam or construction in plies of the fibre-reinforcing structure, wherein each ply is deposited while being penetrated by the connecting elements,
   f) feeding the connecting elements through openings of the connection pieces provided for this purpose,
   g) constructing the outer shell from fibre-reinforcing material and impregnating the fibre-reinforcing material of outer shell and ring beam with matrix material,
   h) jointly consolidating ring beam and outer shell,
   i) fixing the connecting elements such that they are fixed on both sides of the ring beam, including the connection pieces.

2. The method according to claim 1, wherein step b) is realized by the construction of the fibre-reinforcing structure, which is dry or impregnated with matrix material, of the ring beam in the section mould.

3. The method according to claim 1, wherein the section mould is represented by a suitably milled core.

4. The method according to claim 1, wherein step b) is effected by the construction of the fibre-reinforcing structure, which is dry or impregnated with matrix material, of the ring beam in a mould outside of the mould for the outer shell.

5. The method according to claim 1, wherein the connection pieces are placed in the section mould before step b).

6. The method according to claim 1, wherein step c) and step d) are effected jointly in that the connecting elements are prepared as part of the connection pieces.

7. The method according to claim 1, wherein step d) includes a fitting of a tip on each connecting element to support the penetration of fibre plies.

8. The method according to claim 7, wherein the tip of each connecting element is removed after step h).

9. The method according to claim 1, wherein step d) includes a fitting of a casing in an area of the connecting elements which comes into contact with the material of the ring beam.

10. The method according to claim 9, wherein the casing remains as internal thread in the ring beam after the connecting element is removed.

11. The method according to claim 1, wherein a section of the connection piece is also fixed in step i).

12. The method according to claim 2, wherein the connection pieces are placed in the section mould before step b).

13. The method according to claim 2, wherein step c) and step d) are effected jointly in that the connecting elements are prepared as part of the connection pieces.

14. The method according to claim 2, wherein step d) includes a fitting of a tip on each connecting element to support the penetration of fibre plies.

15. The method according to claim 14, wherein the tip of each connecting element is removed after step h).

16. The method according to claim 2, wherein step d) includes a fitting of a casing in an area of the connecting elements which comes into contact with the material of the ring beam.

17. The method according to claim 16, wherein the casing remains as internal thread in the ring beam after the connecting element is removed.

18. The method according to claim 2, wherein a section of the connection piece is also fixed in step i).

* * * * *